United States Patent [19]
Ohya et al.

[11] Patent Number: 5,760,560
[45] Date of Patent: Jun. 2, 1998

[54] ROBOT APPARATUS

[75] Inventors: Tomoki Ohya, Minamitsuru-gun; Yoshiki Hashimoto, Hadano, both of Japan

[73] Assignee: Fanuc, Ltd., Yamanashi, Japan

[21] Appl. No.: 821,726

[22] Filed: Mar. 20, 1997

Related U.S. Application Data

[63] Continuation of Ser. No. 446,620, filed as PCT/JP94/01678 Oct. 6, 1994, abandoned.

[30] Foreign Application Priority Data

Oct. 21, 1993 [JP] Japan .................. 5-263485

[51] Int. Cl.$^6$ .................. B25J 19/00; B05B 15/12
[52] U.S. Cl. .................. 318/568.1; 318/568.12; 901/43; 901/45
[58] Field of Search .................. 318/560–696; 414/217, 225, 416, 744.2, 744.5; 901/9, 15, 6, 49, 19, 20, 23; 395/80–99; 364/468, 478, 474.11; 29/563, 38.9; 19/121 LU, 121 LV, 121 LA, 121 LS; 118/323, 326

[56] References Cited

U.S. PATENT DOCUMENTS

| | | | |
|---|---|---|---|
| 4,379,335 | 4/1983 | Kirsch . | |
| 4,385,358 | 5/1983 | Ito et al. | 364/513 |
| 4,420,812 | 12/1983 | Ito et al. | 364/513 |
| 4,644,897 | 2/1987 | Fender | 118/323 |
| 4,659,902 | 4/1987 | Swensrud et al. | 219/121 LU |
| 4,743,819 | 5/1988 | Hashizume | 318/368 |
| 4,801,856 | 1/1989 | Wajima | 318/568 |
| 4,870,592 | 9/1989 | Lampi et al. | 364/468 |
| 4,922,434 | 5/1990 | Fule | 364/513 |
| 4,931,711 | 6/1990 | Naruo | 318/568.13 |
| 5,038,089 | 8/1991 | Szakaly | 318/568.11 |
| 5,047,700 | 9/1991 | Szakaly | 318/568.1 |
| 5,086,400 | 2/1992 | Hayati et al. | 395/95 |
| 5,115,179 | 5/1992 | Fujii et al. | 318/568.13 |
| 5,126,645 | 6/1992 | Yoshimi et al. | 318/568.11 |
| 5,170,034 | 12/1992 | Seshimo et al. | 219/125.1 |
| 5,201,630 | 4/1993 | Ishida et al. | 414/744.5 |
| 5,204,598 | 4/1993 | Torii et al. | 318/568.1 |
| 5,212,433 | 5/1993 | Yasuyuki . | |
| 5,444,342 | 8/1995 | Matsuo et al. | 318/563 |
| 5,486,080 | 1/1996 | Sieradzki | 414/217 |

FOREIGN PATENT DOCUMENTS

| | | |
|---|---|---|
| 2-109693 | 4/1990 | Japan . |
| 4-105086 | 4/1992 | Japan . |
| 89 11382 | 11/1989 | WIPO . |

*Primary Examiner*—Paul Ip
*Attorney, Agent, or Firm*—Staas & Halsey

[57] ABSTRACT

A robot apparatus which does not need an expensive connecting cable for connecting a robot to a controller. Since the controller is separately composed of a control unit (12), an operation box (13) and a teaching pendant (14), the size of the control unit (12) except an operation system can be reduced, the control unit (12) can be installed in a small dead space within a safety fence which cannot be intrinsically used and directly coupled with the robot (11) without using a connecting cable therebetween. The operation box (13) and the teaching pendant (14) as the operation system are installed outside of the safety fence (15).

7 Claims, 4 Drawing Sheets

ROBOT APPARATUS

This application is a continuation, of application Ser. No. 08/446,620, filed May 31, 1995, now abandoned. PCT/JP94/0/678, filed Oct. 6, 1994.

DESCRIPTION

1. Technical Field

The present invention relates to a robot apparatus, and more specifically, to a robot apparatus which does not need a connecting cable for connecting a robot to a controller of the robot apparatus.

2. Background Art

FIG. 4 is a view showing a conventional robot apparatus. In FIG. 4, numeral 1 denotes a robot and numeral 2 denotes a controller of the robot apparatus. The controller 2 is installed outside of a safety fence 3 disposed to surround the robot 1 and connected to the robot 1 through a connecting cable 4.

The robot 1 includes servo motors for driving respective axes of a hand, an arm, etc., pulse coders for detecting the positions of them, various sensors and the like. The controller 2 includes a control circuit, a servo amplifier, an operation panel and the like. The connecting cable 4 for connecting the robot 1 to the controller 2 is composed of a power cable for driving the servo motors of the robot 1 and a signal cable for transmitting a signal from the sensors. The connecting cable 4 is protected by being wired through equipment such as a cable duct, groove or the like disposed in a floor on which the robot 1 is installed.

The controller 2 is usually installed along a predetermined path for operators formed on the floor on which the robot 1 is installed and outside of the safety fence 3 disposed to surround the operation area of the robot 1. When such a space for installation is not available, a bridge may be provided above the robot 1 to install the controller 2 thereon. In any case, the robot 1 is connected to the controller 2 disposed away from the robot 1 through the connecting cable 4 and the connecting cable 4 is provided with an equipment for protecting it.

Since the conventional controller 2 is installed at a position away from the robot 1, the connecting cable 4 is indispensable to connect them and accordingly a space for installing the connecting cable 4 and equipment for protecting the cable 4 are needed. The connecting cable 4 must include heavy power cables as many as the servo motors provided for the robot 1 and further a plurality of signal cables are added to the power cables. Therefore, a considerable number of cores of the cable are contained in the connecting cable 4 and the longer is a distance between the robot 1 and the controller 2, the higher is the manufacturing cost of the robot apparatus. Further, since the controller 2 must be installed outside of the operation area of the robot 1, i.e., outside of the safety fence 3, a space for installing the controller 2 must be secured.

When a change of facilities of a factory such as a positional movement of the controller 2 is required, the controller 2 must be disconnected from the robot 1, which is carried out by removing the connector of the connecting cable 4. Since the connecting cable 4 is very heavy, the handling of the cable 4 is not easy when it is removed and reinstalled. Moreover, since the facility for protecting the connecting cable 4 is additionally needed, even if the robot 1 or the controller 2 is moved, for example, by 1 meter, it requires a heavy job.

DISCLOSURE OF THE INVENTION

Taking the above into consideration, an object of the present invention is to provide a robot apparatus which does not need an expensive connection cable for connecting a robot to a controller.

To accomplish the above object, in accordance with the present invention, there is provided a robot apparatus composed of a robot and a controller for controlling the robot, which comprises a control unit installed at a place adjacent to the robot within a dead space of the operating area of the robot, an operation box connected to the control unit through an operation system connecting cable and installed on the outside of a safety fence surrounding the operation area of the robot, and a teaching pendant connected to said operation box and disposed on the outside of said safety fence.

According to the above arrangement, the control unit of the controller containing a servo amplifier for driving the servo motors of the robot is installed adjacent to the robot, whereby outputs from the control unit can be directly coupled with the robot. On the other hand, since the operation box and the teaching pendant of the controller cannot be installed inside of the safety fence for the safety of the operators, they are separated from the control unit and disposed outside of the safety fence. Since these operation box and teaching pendant are small in size and light in weight, they can be hooked on the safety fence and a certain space is not needed for their installation.

BEST MODE OF CARRYING OUT THE INVENTION

An embodiment of the present invention will be described below with reference to the drawings.

Figure 1:
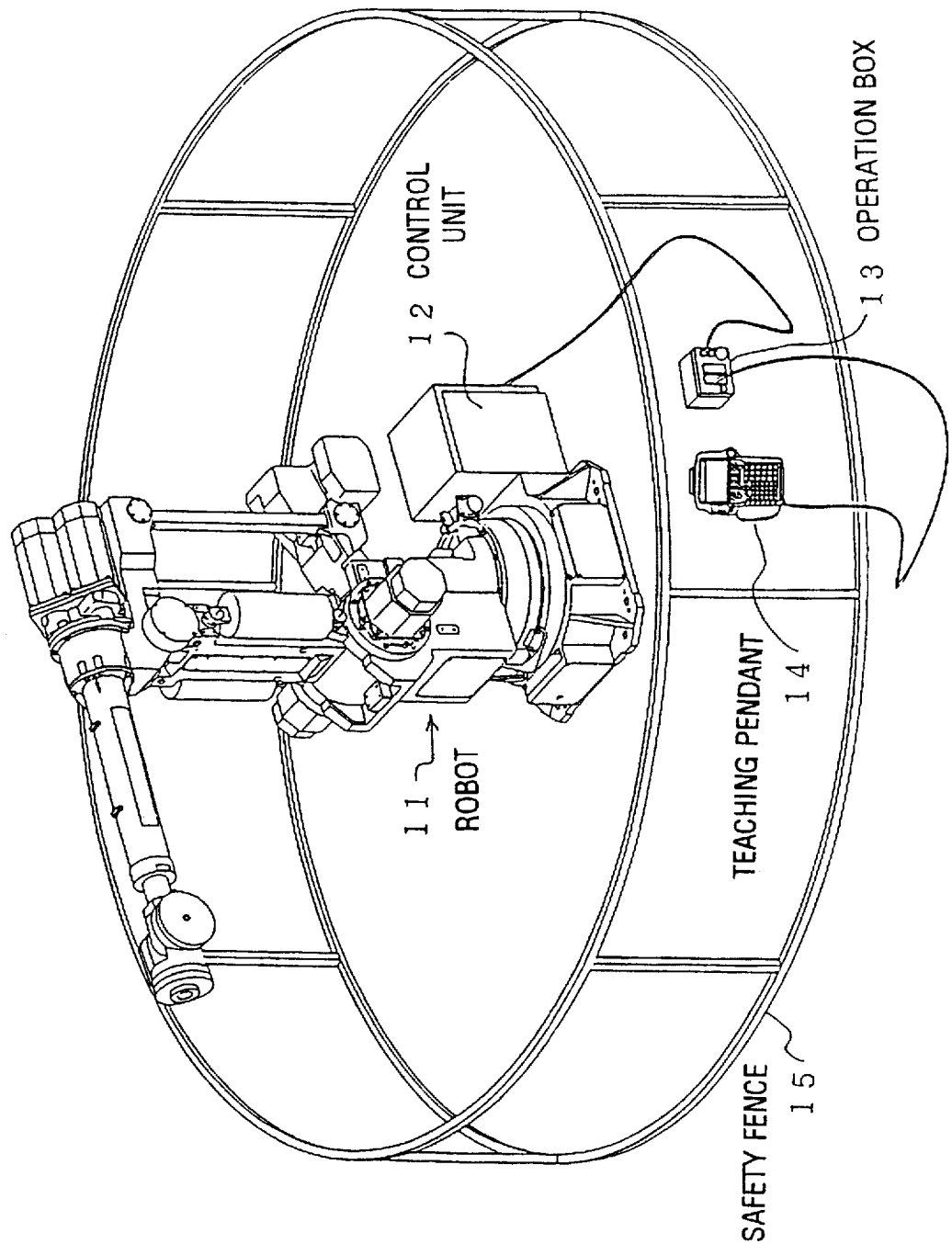
FIG. 1 is a view showing an arrangement of a robot apparatus according to the present invention.

FIG. 1 is a view showing the arrangement of a robot apparatus according to the present invention. In FIG. 1, a robot apparatus is composed of a robot 11 and a controller which is separately composed of a control unit 12, an operation box 13 and teaching pendant 14. The control unit 12 of the controller is installed within a safety fence 15 disposed to surround the operation area of the robot 11. The operation box 13 and the teaching pendant 14 are disposed outside of the safety fence 15.

The control unit 12 of the controller is installed at a position adjacent to the robot 11 which is within the dead space of the operation area of the robot 11. More specifically, this position is located in the space surrounded by the angular range which cannot be covered by the robot 11 when the robot 11 rotates about a vertical axis as well as surrounded by the angular range which cannot be covered by the robot 11 when it rotates about a horizontal axis, i.e., this space is a dead space which cannot be intrinsically used. The size of the control unit 12 can be reduced by separately installing the control unit 12 from the operation box 13 and the teaching pendant 14. Thus, the control unit 12 can be installed in such a small dead space.

Since the control unit 12 is disposed in the vicinity of the robot 11, no special connecting cable is needed to connect them and the control unit 12 is directly coupled with a connector of the robot 11 through a connector attached to the control unit 12. The control unit 12 is connected to the operation box 13, and the operation box 13 is connected to the teaching pendant 14 through an operation system signal cable, respectively.

It is preferable that the operation box 13 and the teaching pendant 14 of the controller are provided with suitable hooking means and are hooked on a support column or guard rail of the safety fence 15 from the outside thereof. The operation box 13 may be fixed to the safety fence 15.

Figure 2:
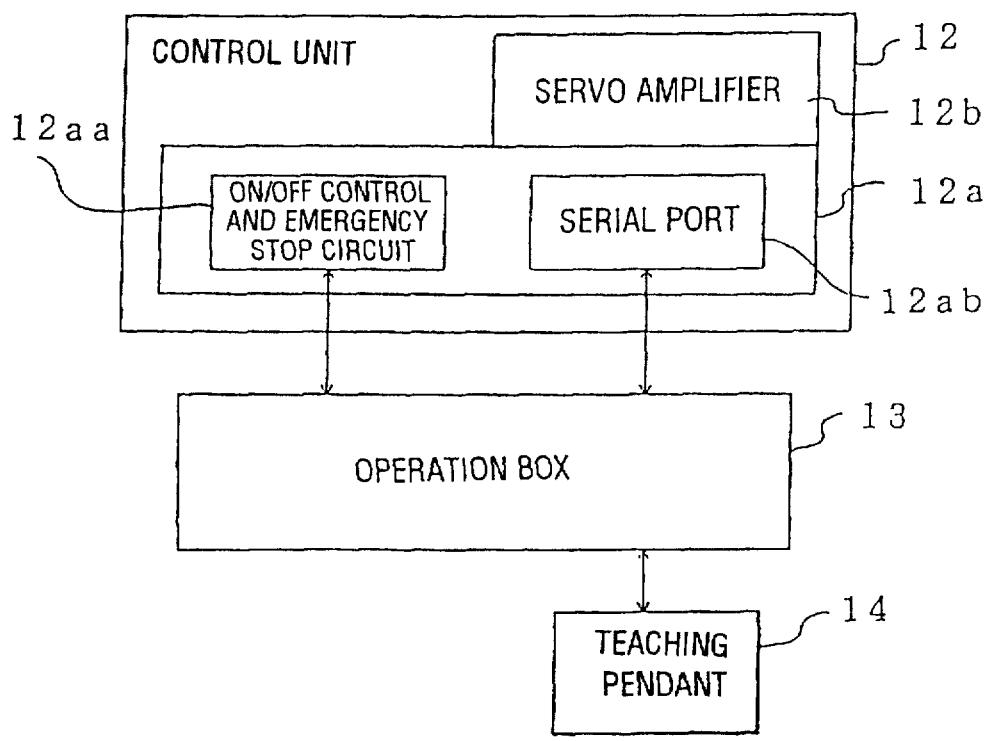
FIG. 2 is a block diagram showing an arrangement of a controller.

FIG. 2 is a block diagram showing an arrangement of the controller. The control unit 12 includes a control circuit 12a for controlling the robot 11 as a whole and a servo amplifier 12b for driving servomotors built in the robot 11. The control circuit 12a includes an ON/OFF control and emergency stop circuit 12aa for responding to the state of an operation switch provided in the operation box 13 and a serial port 12ab for making communication with the teaching pendant 14 or other communication control unit through the operation box 13 as components relating to the connection to the operation box 13.

Although it is not shown, the control circuit 12a further includes a processor for managing the control of the robot apparatus as a whole, a read only memory in which a system program is stored, a random access memory in which robot operation programs and the like are stored, a digital servo control circuit for controlling the servo amplifier 12b, an analog/digital I/O circuit for connecting with an external unit, and the like. Although it is not shown, the control unit 12 further includes a large capacity memory in which teaching data is stored, a power supply circuit and the like.

Figure 3:
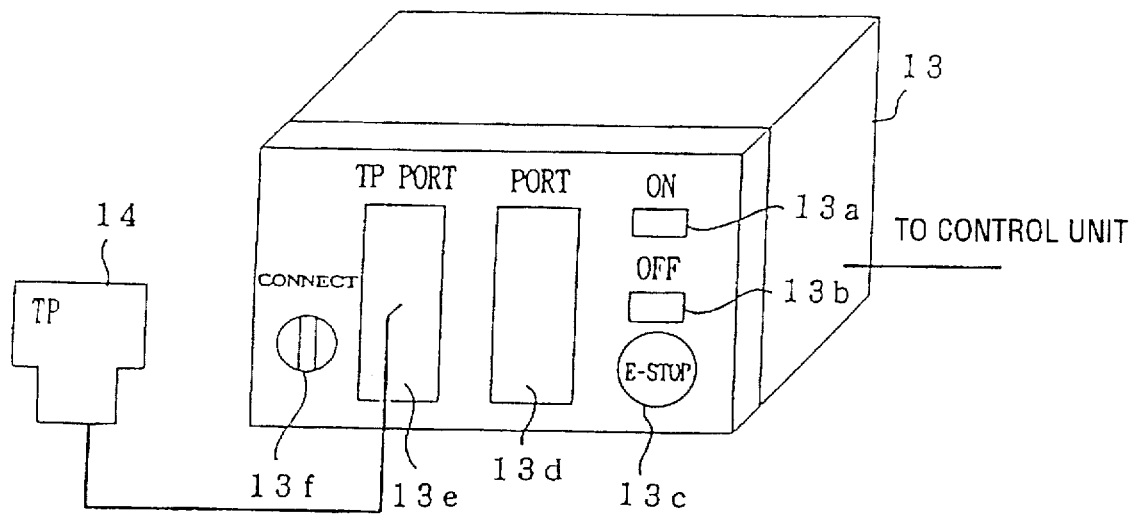
FIG. 3 is a view showing an external appearance of an operation box of the controller.
Figure 4:
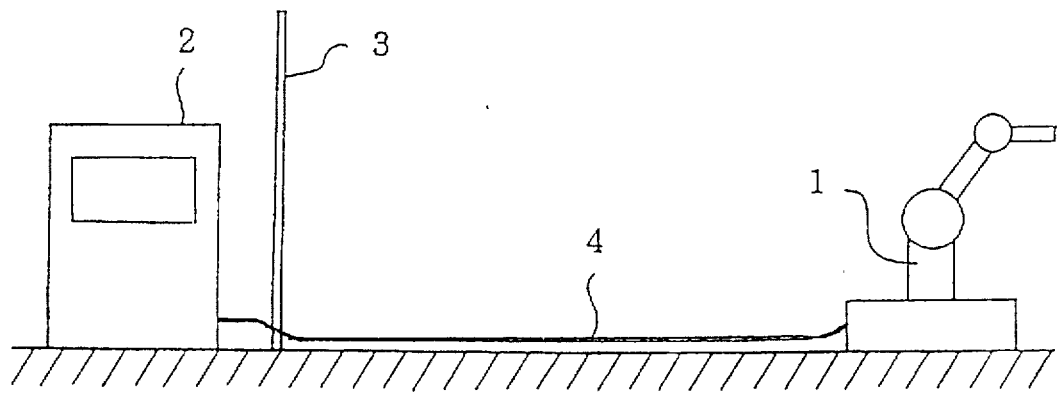
FIG. 4 is a view showing a conventional robot apparatus.

FIG. 3 is a view showing an external appearance of the operation box 13 of the controller. Disposed on the front panel of the operation box 13 are a power supply turning ON switch 13a and a power supply turning OFF switch 13b for controlling the power supply of the controller, an emergency stop button 13c, a communication port 13d to which other communication control unit can be connected, a teaching pendant connecting port 13e to which the teaching pendant 14 is connected and a teaching pendant connecting switch 13f.

The power supply ON switch 13a, the power supply OFF switch 13b and the emergency stop button 13c are connected to the ON/OFF control and emergency stop circuit 12aa of the control circuit 12a, and the turning ON/OFF and emergency stop of the power supply can be remote controlled from outside of the safety fence 15. The serial port 12ab of the control circuit 12a is connected to the teaching pendant 14 through the teaching pendant connecting port 13e. The effectiveness of the teaching pendant 14 is switched by the teaching pendant connecting switch 13f.

As described above, according to the present invention, since the controller is separately composed of the control unit, the operation box, and the teaching pendant, the size of the control unit can be reduced, so that the control unit can be installed in a narrow place adjacent to the robot which is within the dead space of the operating area of the robot. Since the control unit can be disposed next to the robot as described above, the control unit can be directly coupled with the robot through the connectors, thus an expensive connecting cable for connecting them is not needed and the cost of the robot apparatus can be greatly reduced.

Further, since it suffices to dispose only the operation box and the teaching pendant on the safety fence from the outside thereof, there is not required a certain place where the operation box and the teaching pendant are to be installed and a portion of the path for operators is not occupied by them at all. Thus, a space where the robot apparatus is installed can be minimized.

We claim:

1. A robot apparatus comprising:

a robot moveable within an operating space of an operating area and requiring power for each movement of the robot;

a control unit mechanically connected to the robot without requiring a connecting cable for connecting the robot to the control unit of the robot apparatus, the control unit having a servo amplifier for supplying to the robot the required power for each movement, the control unit being located immediately adjacent to the robot, within a dead space which is within the operating area, but outside the operating space;

a safety fence surrounding the operation area of the robot;

an operation box located outside of the safety fence and outside the operation area;

an operation system connecting cable for connecting the operation box and the control unit; and a teaching pendent connected to said operation box and located outside of the safety fence and outside the operation area, the operation box and teaching pendent enabling remote control of the robot.

2. A robot apparatus according to claim 1, wherein said operation box includes operation switches including a power supply switch and an emergency stop button, a connecting port for connection to said teaching pendant, and a communication port for communication with a peripheral unit.

3. A robot apparatus according to claim 1, wherein the operation box is provided with attachment means for attaching the operation box to the safety fence.

4. A robot apparatus according to claim 1, wherein the teaching pendant is provided with attachment means for attaching the teaching pendent to the safety fence.

5. A robot apparatus comprising:

a robot moveable within an operating space of an operating area and having servo motors for the movements of the robot;

a control unit mechanically connected to the robot without requiring a connecting cable for connecting the robot to the control unit of the robot apparatus, the control unit being located immediately adjacent to the robot, within a dead space which is within the operating area, but outside the operating space, control unit having a servo amplifier for driving the servo motors in the robot, and an on/off control and emergency stop circuit;

a safety fence surrounding the operation area of the robot;

an operation box located outside of the safety fence and outside the operation area, the operation box having an emergency stop mechanism in communication with the on/off control and emergency stop circuit of the control unit;

an operation system connecting cable for connecting the operation box and the control unit; and a teaching pendent connected to said operation box and located outside of the safety fence and outside the operation area, the operation box and teaching pendent enabling remote control of the robot.

6. A robot apparatus according to claim 5, wherein the control unit further has a processor for managing control of the robot apparatus as a whole, a read only memory in which a program is stored, a random access memory in which robot operation programs are stored and a digital servo control circuit for controlling the servo amplifier.

7. A robot apparatus according to claim 6, wherein the control unit further has an analog to digital I/O circuit for external connection, a large capacity memory in which teaching data is stored and a power supply circuit.

* * * * *

UNITED STATES PATENT AND TRADEMARK OFFICE
CERTIFICATE OF CORRECTION

PATENT NO. : 5,760,560
DATED : June 2, 1998
INVENTOR(S) : Ohya et al.

It is certified that error appears in the above-identified patent and that said Letters Patent is hereby corrected as shown below:

Title Page [63], after "filed" insert --May 31, 1995--;

Signed and Sealed this

Tenth Day of November 1998

Attest:

BRUCE LEHMAN

Attesting Officer

Commissioner of Patents and Trademarks